United States Patent [19]

Stewart

[11] Patent Number: 5,772,154
[45] Date of Patent: Jun. 30, 1998

[54] LEADING EDGE HEAT SHIELD FOR WINGS OF SPACECRAFT

[75] Inventor: David A. Stewart, Santa Cruz, Calif.

[73] Assignee: The United States of America as represented by the Administrator of the National Aeronautics and Space Administration, Washington, D.C.

[21] Appl. No.: 563,418

[22] Filed: Nov. 28, 1995

[51] Int. Cl.⁶ .............................. B64G 1/22; B64G 1/46; B64G 10/50; B64C 1/12
[52] U.S. Cl. ..................... 244/158 A; 244/163; 244/131; 244/132; 244/121
[58] Field of Search ........................... 244/158 R, 158 A, 244/160, 163, 130, 131, 132, 120, 121, 123, 129.1

[56] References Cited

U.S. PATENT DOCUMENTS

| 3,028,128 | 4/1962 | Friedrich | 244/117 |
| 3,114,319 | 12/1963 | Smith | 244/158 A |
| 3,114,524 | 12/1963 | Conn, Jr. et al. | 244/117 |
| 3,130,940 | 4/1964 | Erb et al. | 244/1 |
| 3,799,056 | 3/1974 | Colignon | 102/105 |
| 4,073,985 | 2/1978 | San Miguel | 244/158 A |
| 4,338,368 | 7/1982 | Dotts et al. | 428/212 |
| 4,344,591 | 8/1982 | Jackson | 244/158 A |
| 4,400,421 | 8/1983 | Stover | 244/158 A |
| 4,456,208 | 6/1984 | Macconochie et al. | 244/158 A |
| 4,693,435 | 9/1987 | Percival et al. | 244/91 |
| 4,713,275 | 12/1987 | Riccitiello et al. | 428/76 |
| 5,489,074 | 2/1996 | Arnold et al. | 244/121 |
| 5,560,569 | 10/1996 | Schmidt | 244/121 |

Primary Examiner—V. Lissi Mojica
Attorney, Agent, or Firm—Kathleen Dal Bon; Harry Lupuloff; John G. Mannix

[57] ABSTRACT

A heat shield for thermally insulating the leading edge of a wing of a spacecraft during ascent and reentry includes a plurality of rigid tiles. Each tile is formed with a pie-shaped element which interlocks with the complementarily-formed element of another tile. The combination of structure afforded by the pie-shaped elements substantially impedes hypersonic flow of any gases that might enter the gaps between tiles.

9 Claims, 1 Drawing Sheet

LEADING EDGE HEAT SHIELD FOR WINGS OF SPACECRAFT

ORIGIN OF INVENTION

The invention described herein was made by an employee of the United States Government and may be manufactured and used by and for the Government for governmental purposes without payment of any royalties thereon or therefor.

BACKGROUND OF THE INVENTION a. Technical Field of the Invention

The present invention relates generally to thermal insulation systems for spacecraft, and more particularly to methods and apparatus for configuring thermally insulative tiles for covering and thereby insulating the wing leading edges of a spacecraft.

b. Description of the Prior Art

Spacecraft must be protected from frictional heat that is generated when the spacecraft move rapidly through the Earth's atmosphere during ascent and reentry. Accordingly, thermal protection systems (TPS) have been developed to protect spacecraft from high temperatures during the spacecrafts' passage through the atmosphere.

Typical of TPS is the system currently used to protect U.S. space shuttles from heat. Essentially, the TPS used on the shuttle includes a large number of small, thermally insulative rigid tiles which are bonded to the skin of the shuttle. Also, reinforced carbon-carbon systems are used to cover certain surfaces that tend to become particularly hot during ascent and reentry, e.g., the leading edges of the wings of the spacecraft.

While effective in insulating the leading edges of the wings, carbon-carbon TPS are heavy and expensive. This is undesirable, particularly for commercial applications, because a concomitant increase in flight cost and decrease in flight payload results from the use of heavy, expensive TPS material.

In contrast, rigid, small TPS tiles are less expensive and lighter than the carbon-carbon TPS currently used to insulate the leading edges of spacecraft wings. Unfortunately, it might happen that if current tiles were used to cover the wing leading edge, hot atmospheric gases could hypersonically penetrate the small gaps between adjacent tiles. This is particularly true at zero yaw condition where the hot gases can penetrate directly into the gaps. Such hypersonic gas penetration could cause damage to the tiles and potentially to the skin of the leading edge of the wing itself. While insulative material can be deposited in the gaps to somewhat alleviate this problem, some damage nevertheless can occur under unfavorable conditions. As recognized by the present invention, however, it is possible to facilitate the effective use of tiles to cover spacecraft wing leading edges by impeding hypersonic nozzle flow of gases through the gaps between tiles.

Accordingly, it is an object of the present invention to provide a thermally insulative heat shield for the leading edge of the wing of a spacecraft in which supersonic flow of gas between tiles is inhibited. Another object of the present invention is to provide a thermally insulative heat shield for the leading edge of the wing of a spacecraft which can use current tile materials. Yet another object of the present invention is to provide a thermal protection system for a spacecraft wing leading edge which is easy to use and cost effective.

SUMMARY OF THE INVENTION

A heat shield that is configured for engaging the leading edge of a wing of a spacecraft includes a first thermally insulative tile formed with a first pie-shaped element. A second thermally insulative tile includes a second pie-shaped element which is configured for closely engaging the first element, such that when the tiles are engaged with each other, hypersonic gas flow between the tiles is inhibited.

Preferably, each of the pie-shaped elements is characterized by opposed planar surfaces that are oriented at an oblique angle relative to the leading edge. More preferably, the wing defines an elevational dimension, and the oblique planar surfaces establish an angle of about thirty degrees (30°) relative to the elevational dimension. As described in detail below, each tile defines a curved leading surface and an inner surface, and the inner surface of each tile is formed with a channel which is configured for closely receiving the leading edge of the wing therein.

In another aspect of the present invention, a thermal insulation system for a spacecraft having a wing defining a leading edge includes a plurality of rigid thermally insulative tiles. The tiles are engaged with the leading edge to insulate the leading edge. In accordance with the present invention, each tile is configured to interlockingly engage at least one other tile such that hypersonic gas flow between adjacent tiles is substantially impeded.

In still another aspect of the present invention, a first thermally insulative tile is configured for engaging the leading edge of a wing of a spacecraft and for interlockingly engaging a second thermally insulative tile that is positioned on the wing. The first tile includes a first pie-shaped element configured for closely engaging a element of the second tile. Consequently, when the tiles are engaged with each other, hypersonic gas flow between the tiles is inhibited.

The details of the present invention, both as to its construction and operation, can best be appreciated in reference to the accompanying drawings, in which like reference numerals refer to like parts, and in which:

DETAILED DESCRIPTION OF THE INVENTION

Figure 1:
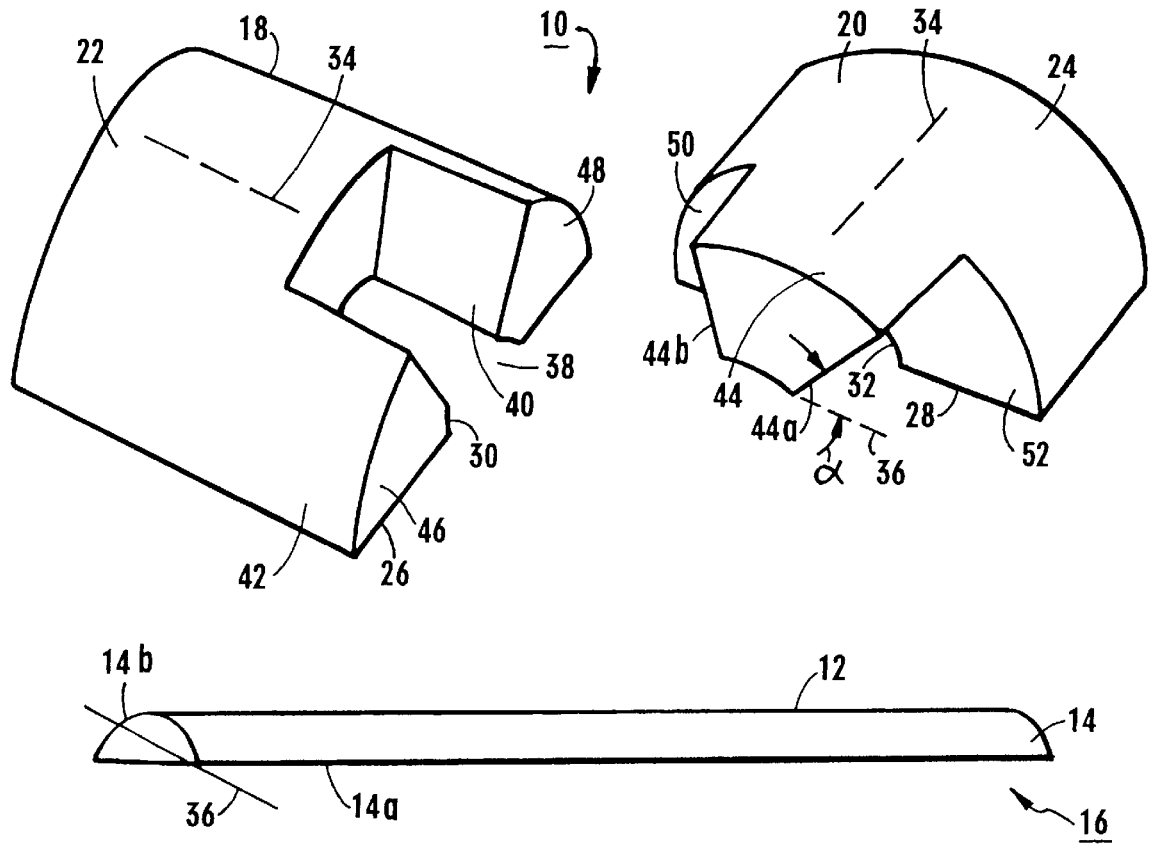
FIG. 1 is a perspective of two co-interlocking tiles of the present invention if an exploded relationship with each other, with the stagnation stream line shown in phantom and with portions of the wing broken away.

Referring initially to FIG. 1, a heat shield is shown, generally designated 10, which is configured for engaging the leading edge 12 of a wing 14 of a spacecraft, generally designated 16. As shown, the heat shield 10 includes at least first and second rigid thermally insulative tiles 18, 20. It is to be understood that the heat shield 10 can include additional tiles (not shown in FIG. 1) which are configured in accordance with the principles disclosed herein.

Each tile 18, 20 is made of a rigid fibrous insulation material that is suitable for insulating spacecraft. For example, the tiles 18, 20 can be made of the material colloquially referred to as fibrous refractory composite insulation and disclosed in U.S. Pat. No. 4,148,962, incorporated herein by reference, or the material referred to as "CIRCA", disclosed in U.S. patent application Ser. No. 08/212,640 and incorporated herein by reference. Further, if desired a thermal coating, e.g., the coating colloquially referred to as "TUFI" and disclosed in U.S. Pat. No. 5,079,082, incorporated herein by reference, can be sintered onto each tile 18, 20.

FIG. 1 shows that the tiles 18, 20 define respective curved leading surfaces 22, 24 and respective curved inner surfaces 26, 28. As shown, the inner surface 26, 28 of each tile 18, 20 is formed with a respective channel 30, 32 that is configured for closely receiving the curved leading edge 12 of the wing 14 therein.

Thus, the inner surfaces 26, 28 of the tiles 18, 20 are juxtaposed and engaged with the leading edge 12 of the wing 14, and are bonded to the wing 14 by means well-known in the art. Further, the leading surfaces 22, 24 of the tiles 18, 20 are opposed to the respective inner surfaces 26, 28. Consequently, the leading surfaces 22, 24 are the wing leading edges when the spacecraft 16 is in aerodynamic flight.

Accordingly, when the spacecraft 16 is in aerodynamic flight, a stagnation stream line 34 is established along the leading surfaces 22, 24 in accordance with the aerodynamics of flight. It is to be understood that the stagnation stream line 34 and leading edge 12 shown in FIG. 1 are referenced to a spacecraft 16 "zero" attitude, i.e., the reference stagnation stream line 34 is to a zero degree (0°) spacecraft 16 yaw, pitch, and roll. Moreover, the wing 14 defines an elevational dimension 36 between its upper surface 14a and lower surface 14b, and as the skilled artisan will readily recognize, the elevational dimension 36 is perpendicular to the leading edge 12 and, hence, to the reference stagnation stream line 34.

With the above disclosure in mind, the details of the structure and cooperation of the present tiles 18, 20 can be appreciated. FIG. 1 shows that the first tile 18 is formed with a trough-like pie-shaped female element 38 that is established by first pie-shaped members 40, 42. On the other hand, the second tile 20 is formed with a second pie-shaped element 44 which is configured for closely engaging the female element 38. Specifically, in the embodiment shown, the second pie-shaped element 44 is a male element which is closely received in the female element 38.

I have discovered that owing to the pie-shaped structure of the present invention, when the tiles 18, 20 are engaged with each other, hypersonic gas flow between the tiles 18, 20 is inhibited. Stated differently, the tiles 18, 20 are geometrically configured to mechanically interlockingly engage each other such that hypersonic gas flow between them is substantially impeded. More particularly, end surfaces 46, 48 of the first pie-shaped members 40, 42, which are oriented perpendicular to the stagnation line 34, abut surfaces 50, 52 of the second pie-shaped element 44 to establish a bleed gap to which atmospheric gas can slowly (i.e., subsonically) pass from the stagnation line 34. Thereby, hypersonic gas flow between the gaps that are established between the tiles 18, 20 is substantially inhibited, thus inhibiting damage to the tiles 18, 20 and wing 14 during ascent and reentry.

In the embodiment shown in FIG. 1, taking the second pie-shaped element 44 as an example, the second element 44 is characterized by opposed planar surfaces 44a, 44b. It can be appreciated that the surfaces 44a, 44b are oriented at an oblique angle α relative to the leading edge 12 (and, thus, to the elevational dimension 36) when the tiles are engaged with the wing. Preferably, each surface 44a, 44b establishes an angle α of about thirty degrees (30°) relative to the elevational dimension 36. Using another reference, each surface 44a, 44b establishes an angle of about sixty degrees (60°) relative to the fore-and-aft dimension of the spacecraft 16. It is to be understood that the female element 38 that is established by the first pie-shaped members 40, 42 is complementarily configured to the second pie-shaped element 44 in accordance with the principles of the present invention described above. It may now be appreciated in reference to FIG. 1 that as used herein, a "pie-shaped" male element defines a 120° pie-shaped portion of a solid cylinder, with the planes defined by sides of the element intersecting at the axis of the cylinder and with the central core of the "pie" removed.

Figure 2:
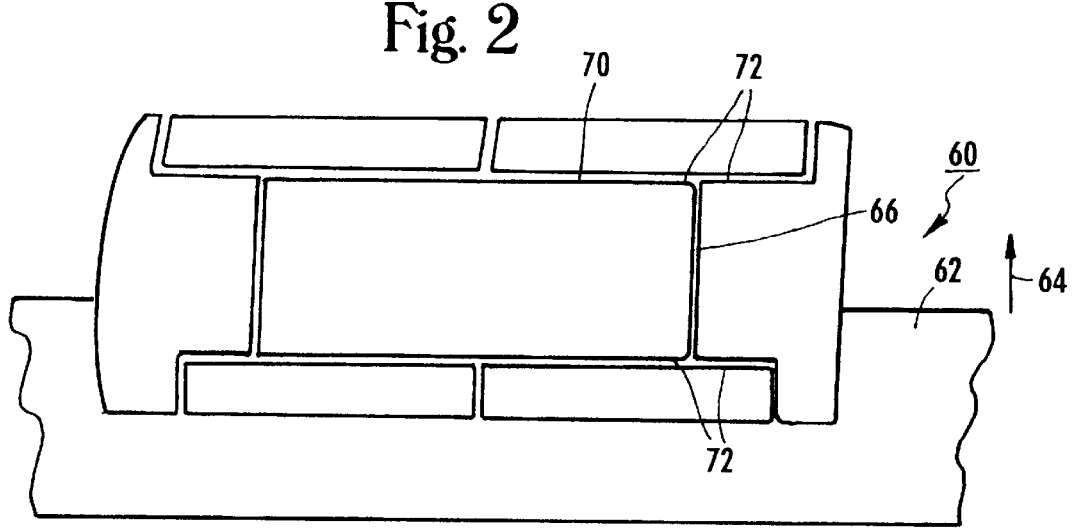
FIG. 2 is a perspective view of a plurality of tiles interlocked with each other, as would be seen looking down on the leading edge of a wing of a spacecraft from above the wing, with portions of the wing broken away.

FIG. 2 shows a plurality of tiles, generally designated 60, which are attached to the leading edge of a wing 62. The direction of aerodynamic flight of the wing 62 is indicated by the arrow 64. A plurality of gaps, at least one of which is a bleed gap 66, are established between the tiles 60. Although the perspective view of FIG. 2 does not show the obliquely-oriented surfaces of the tiles 60, it is to be understood that the tile surfaces which would extend into the surface of FIG. 2 from the gaps 68, 70 that are perpendicular to and that bound the bleed gap 66 are obliquely oriented in accordance with the principles disclosed above.

Thus, in accordance with the present invention, each tile 60 is formed with a pie shaped element. In contrast to the tiles 18, 20 shown in FIG. 1, however, each trough-like female pie-shaped element 72 is established by a plurality of tiles 60, instead of being unitarily formed in a single tile 60. Nevertheless, the tiles 60 interlockingly engage each other by virtue of the cooperation of structure between their respective pie-shaped elements.

While the particular LEADING EDGE HEAT SHIELD FOR WINGS OF SPACECRAFT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A heat shield configured for engaging the leading edge of a wing of a spacecraft, comprising:

at least one first thermally insulative tile at least in part establishing a first pie-shaped element, the first thermally insulative tile being configured for engaging the leading edge of the wing of the spacecraft; and at least one second thermally insulative tile including a second pie-shaped element configured for closely engaging the first pie-shaped element, the second thermally insulative tile being configured for engaging the leading edge of the wing of the spacecraft, such that when the tiles are engaged with each other, hypersonic gas flow between the tiles is inhibited.

2. The heat shield of claim 1, wherein each of the pie-shaped elements is characterized by opposed planar surfaces oriented at an oblique angle relative to the leading edge when the tiles are engaged with the wing.

3. The heat shield of claim 2, wherein the wing defines an elevational dimension, and the oblique planar surfaces establish an angle of about thirty degrees (30°) relative to the elevational dimension.

4. The heat shield of claim 2, wherein each tile defines a curved leading surface and an inner surface, and the inner surface of each tile is formed with a channel configured for closely receiving the leading edge of the wing therein.

5. A thermal insulation system for a spacecraft having a wing defining a leading edge, comprising:

a plurality of rigid thermally insulative tiles engaged with the leading edge to insulate the leading edge, each tile being configured to interlockingly engage at least one other tile such that hypersonic gas flow between adjacent tiles is substantially impeded, wherein each tile defines a curved leading surface and an inner surface, and the inner surface of each tile is formed with a channel configured for closely receiving the leading edge of the wing therein, wherein the plurality of tiles includes:

at least one first thermally insulative tile including a first pie-shaped element; and at least one second thermally insulative tile including a second pie-shaped element configure for closely engaging the first element.

6. At least one first thermally insulative tile configured for engaging the leading edge of a wing of a spacecraft and for interlockingly engaging at least one second thermally insulative tile positioned on the wing, the first tile comprising:

a first pie-shaped element configured for closely engaging a element of the second tile, such that when the tiles are engaged with each other, hypersonic gas flow between the tiles is inhibited, the pie-shaped element being characterized by opposed planar surfaces oriented at an oblique angle relative to the leading edge when the tile is engaged with the wing, wherein the wing defines an elevational dimension, and the oblique planar surfaces establish an angle of about thirty degrees (30°) relative to the elevational dimension.

7. The system of claim 5, wherein each of the pie-shaped elements is characterized by opposed planar surfaces oriented at an oblique angle relative to the leading edge when the tiles are engaged with the wing.

8. The system of claim 5, wherein the wing defines an elevational dimension, and the oblique planar surfaces establish an angle of about thirty degrees (30°) relative to the elevational dimension.

9. The tile of claim 6, wherein the tile defines a curved leading surface and an inner surface, and the inner surface of the tile is formed with a channel configured for closely receiving the leading edge of the wing therein.

* * * * *